3,205,188
PAINT DISPERSION

Albert J. Cole, Pottstown, Pa., assignor to The Firestone Tire & Rubber Company, Akron, Ohio, a corporation of Ohio
No Drawing. Filed Oct. 3, 1961, Ser. No. 142,520
2 Claims. (Cl. 260—29.7)

This invention relates to an aqueous paint dispersion in which the film-forming component is a graft copolymer which comprises 55 to 75 percent polyvinylchloride as substrate, and a superstrate of 5 to 35 percent butadiene and 5 to 35 percent of 2-ethylhexyl acrylate. The paint contains about 10 to 40 percent pigment, added as a finely ground dispersion. The total solids content (copolymer plus pigment) is 40 to 60 percent by weight of the total dispersion, the remaining 60 to 40 percent being water.

On drying, the copolymer forms a non-tacky, flexible clear film which maintains the excellent chemical and physical properties of polyvinylchloride. Increased butadiene content increases the tack of the copolymer and increases its resistance to passage of moisture vapor through the film. The octyl acrylate, if used, adds flexibility. On aging (curing), the film becomes tough and water resistant.

The graft copolymer is advantageously prepared by adding sufficient catalyst to the vinyl chloride polymerization so that it is unnecessary to provide additional catalyst for the preparation of the superstrate. This avoids the possibility of homopolymerization or copolymerization of the one or more monomers added for production of the superstrate during the graft polymerization. The live polyvinylchloride latex may be stored indefinitely in a closed container, and then used in the graft polymerization without added catalyst.

An example which is typical of the preparation of the graft copolymer follows, but it is understood that the invention is not limited thereto.

PREPARATION OF THE SUBSTRATE

The substrate is formed from the following:

| | Parts |
|---|---|
| Vinyl chloride | 100 |
| Emulsifying agent [1] | 7.0 |
| Potassium persulfate | 0.015 |
| Na$_2$HPO$_4$ (anhydrous) | 0.308 |
| Water | 107 |

[1] Alkyl aryl sulfonate is satisfactory.

The potassium persulfate is used as a catalyst and other peroxide catalysts, as well as other catalysts, may be used, as is well known in the art. The sodium phosphate is used as a buffer, and other such buffers may be employed, such as sodium borate (borax).

The reaction mixture was heated to 45° C. for 16 to 18 hours to substantially complete conversion. On cooling to room temperature, the latex can be stored indefinitely prior to the graft copolymerization. In production of the graft, butadiene is added with 2-ethylhexyl acrylate (identified as EHA in the following) in the proportions required to yield a graft copolymer which on aging gives a film of desired hardness, water resistance, MVT (moisture-vapor-transmission) rate, tack, low-temperature flexibility and strength.

GRAFT POLYMERIZATION

The recipe for a typical graft copolymer follows:

| | Parts |
|---|---|
| Polyvinylchloride latex (130 parts, 50% solids) | 65 |
| Butadiene | 20 |
| 2-ethylhexyl acrylate | 15 |
| Water (in addition to that in latex) | 35 |
| Dodecyl mercaptan | 0.08 |

The polyvinylchloride may be that produced as above described. The dodecylmercaptan is added as a promoting agent. The final water content of the paint (usually about 50 percent) is varied, depending upon the amount of water which is to be added subsequently with the pigment dispersion. To produce the graft, the reaction mixture is heated to 65° C. for 16 to 18 hours.

Although the butadiene (i.e. butadiene-1,3) can be replaced by other dienes, butadiene is preferred. The copolymer latex, with or without pigment can be used for moisture-proofing paper, leather treatment, rug backing and adhesives, etc., but the invention is limited to paints with 10 to 40 percent pigment content based on the weight of the paint, and paints prepared from polyvinylchloride graft copolymer in which butadiene and 2-ethylhexyl acrylate are present in the superstrate. Low-temperature flexibility is important in paint films, and this is increased by including 2-ethylhexyl acrylate to provide greater expansion and contraction of the paint film as the base to which it is applied changes in dimensions due to atmospheric or other environmental changes in temperature. The film hardness is dependent upon the composition of the copolymer, and may be increased by baking.

The following table gives the composition and properties of various copolymers without added pigment. The monomers from which the several copolymers were prepared are identified as follows:

VC=vinylchloride
BD=butadiene
EHA=2-ethylhexyl acrylate

The figures denote percentage composition. Where no property is given, it means merely that no test was made to determine that property of the particular copolymer. The pH of the latexes is important, because those with a pH less than 6.5 are shelf stable.

*Properties of Graft copolymer latexes*

| PVC | BD | EHA | pH | Hardness | | Brookfield Visc., cps | Pigment Tolerance, percent | Blister Resistance hrs. | Flexibility −10°, −20° | Sunlamp Degradation Hrs. |
|---|---|---|---|---|---|---|---|---|---|---|
| | | | | Initial | 48 hrs. | | | | | |
| 75 | 20 | 5 | 6.3 | 1 | 24 | 26 | >50 | 20 | Good | 187 |
| 75 | 15 | 10 | | 1 | 23 | | | | | |
| 70 | 15 | 15 | | | | | | | | |
| 70 | 0 | 30 | 3.4 | <1 | 1 | 15 | >50 | >20 | Good | 840 |
| 65 | 30 | 5 | | | | | | | | |
| 65 | 20 | 15 | 6.2 | <1 | 8 | 41 | >50 | 20 | Good | 436 |
| 65 | 5 | 30 | | | | | | | | |
| 60 | 35 | 5 | | | | | | | | |
| 60 | 5 | 35 | 5.6 | <1 | 1 | 54 | >50 | 20 | Good | 816 |

There was no appreciable change in the recorded pH of the several latexes, and their viscosities did not change after storage for over six months.

The hardness results are recorded in Sward hardness. This hardness is determined after 48 hours' exposure to a General Electric Mercury S–1 sun lamp having an ambient temperature of 49°. Accelerated increase in hardness developed by this sun lamp aging is a direct cure of the film. This was accomplished in the following manner: Films were cast on glass plates using a #40 wire wound rod. The films were allowed to air dry for 3 hours after which they were subject to the cure medium; that is the S–1 sun lamp, after which time they were removed, cooled to room temperature, and the increase in hardness measured on a Model C Sward hardness rocker.

The latex may have a Brookfield viscosity of about 18 to 36.

Pigment tolerance is a measure of the compounding stability of a latex. It was evaluated by dispersing several pigments in water and combining these with latex at various pigment volume concentrations until the latex showed coagulation.

The blister resistance of paint film was determined in the following manner: A laboratory hot water bath containing five-inch holes was adapted to be used as a blister box in the following manner: The laboratory steam outlet was connected to the steam coils which heat the hot water bath. The overflow drained into the sink. The water bath was filled to a constant level and the level maintained with a constant level device through a trickle from the water bath. The steam was so adjusted that, with all ports closed, the temperature of the vapor operation above the water was maintained at 85° C. ±1°. Panels upon which the paints were to be tested were cut from six-inch cedar siding 5⅛-inch in diameter and finished so that they fit snugly in the indented top of the water bath.

The method used to determine sum lamp degradation of unsupported latex films was as follows: Clear unpigmented films were prepared by casting films on a glass plate using a #40 wire wound rod, stripping dried film free of the glass and placing the film in a sun lamp exposure card under a General Electric Mercury S–1 sun lamp. A minimum of 100 hours is desirable.

In order to evaluate the flexural properties of the various latexes at reduced temperature, a brittleness test was developed. Free films were cast on heavy gauge aluminum foil. The films were air dried for 16 hours, then placed in a cold box wherein the temperature was reduced to −20° C. At specific temperatures, a ¼-inch diameter mandrel bend was made and the films were examined visually for cracking.

Increased butadiene content with high polyvinylchloride content gives greatest hardness when aged. Increase of 2-ethylhexyl acrylate increases flexibility. Increase of vinyl chloride increases weatherability.

Utilizing the last of the copolymers in the foregoing table, the following is a representative exterior paint formula:

| | Parts |
|---|---|
| Mica | 30 |
| Titanium dioxide | 200 |
| Wollastonite P–1 [2] | 90 |
| Tamol 731, 25% solution [1] | 5.0 |
| Tetra-potassum pyrophosphate | 2.5 |
| Poly glycol P–1200 | 2.8 |
| Latex (graft copolymer) 50% solids | 400 |

[1] Dispersing agent which is a condensation product of an aryl alkyl sulfonate and formaldehyde.
[2] Wollastonite P–1 is a brilliant white calcium metasilicate with about 70–75 percent finer than 20 microns.

Two percent of methyl cellulose thickener was added. Sufficent thickener is added to give a composition suitable for application by a brush or roller.

The foregoing paint had a PVC (pigment volume concentration) of 30 percent, and a Stormer viscosity of 70 to 72.

What I claim is:

1. An air-drying aqueous paint dispersion with a pH of no more than about 6.5, which contains 40 to 60 percent solids content, and of this solids content the pigment constitutes 10 to 40 percent based on the weight of the dispersion, and the remaining solids content is graft copolymer composed essentially of 55 to 75 percent polyvinylchloride substrate, and 5 to 35 percent butadiene and 5 to 35 percent 2-ethylhexyl acrylate as superstrate.

2. The paint of claim 1 in which the graft copolymer composition is substantially 60 percent polyvinylchloride substrate, and the superstrate contains substantially 5 percent of butadiene and substantially 35 percent of 2-ethylhexyl acrylate.

References Cited by the Examiner

UNITED STATES PATENTS

| | | | |
|---|---|---|---|
| 2,795,564 | 6/57 | Conn et al. | 260—29.7 |
| 2,883,355 | 4/59 | Balfe et al. | 260—29.7 |
| 2,894,927 | 7/59 | Elder | 260—881 |
| 2,996,469 | 8/61 | Cole et al. | 260—29.7 |

MURRAY TILLMAN, *Primary Examiner.*

LEON J. BERCOVITZ, *Examiner.*